(12) United States Patent
Yamamoto

(10) Patent No.: US 7,972,735 B2
(45) Date of Patent: Jul. 5, 2011

(54) FUEL CELL SYSTEM AND ACTIVATION METHOD FOR FUEL CELL

(75) Inventor: Jun Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1035 days.

(21) Appl. No.: 11/822,174

(22) Filed: Jul. 3, 2007

(65) Prior Publication Data

US 2008/0014474 A1   Jan. 17, 2008

(30) Foreign Application Priority Data

Jul. 11, 2006 (JP) ................................. 2006-190489
May 15, 2007 (JP) ................................. 2007-129083

(51) Int. Cl.
*H01M 8/04* (2006.01)
*H01M 8/06* (2006.01)

(52) U.S. Cl. ........ 429/431; 429/413; 429/428; 429/429; 429/430; 429/432; 429/450

(58) Field of Classification Search .................. 429/208, 429/218.1, 223, 224, 231.8
See application file for complete search history.

(56) References Cited

U.S. PATENT DOCUMENTS

| 6,524,733 | B1 * | 2/2003 | Nonobe ......................... 429/413 |
| 2004/0175602 | A1 | 9/2004 | Tahara ............................ 429/23 |
| 2008/0220302 | A1 | 9/2008 | Yamamoto et al. | |

FOREIGN PATENT DOCUMENTS

| JP | 2000-277136 | 10/2000 |
| JP | 2004-47427 | 2/2004 |
| JP | 2005-93282 | 4/2005 |

* cited by examiner

*Primary Examiner* — Dah-Wei D Yuan
*Assistant Examiner* — Thomas Wallen
(74) *Attorney, Agent, or Firm* — Fitzpatrick, Cella, Harper & Scinto

(57) ABSTRACT

A fuel cell system capable of performing activation for stabilizing electrical characteristics of a fuel cell with suppressing generation of polarity inversion associated with drying of a polymer electrolyte membrane and excess power consumption. An activation method for a fuel cell, the fuel cell system including a fuel cell having a fuel electrode and an oxidizer electrode that are provided on both sides of a polymer electrolyte membrane; a resistance detector for detecting an internal resistance of the fuel cell; a load connection portion having a mechanism for connecting a resistor between the fuel electrode and the oxidizer electrode; and a control unit for controlling the load connection portion. The control unit controls the operation of the load connection portion based on a value of the inner resistance of the fuel cell, which is detected by the resistance detector.

5 Claims, 9 Drawing Sheets

FUEL CELL SYSTEM AND ACTIVATION METHOD FOR FUEL CELL

BACKGROUND OF THE INVENTION

1. Field of the Invention

The present invention relates to a fuel cell system and an activation method for a fuel cell.

2. Description of the Related Art

A fuel cell directly converts chemical energy, which is obtained by chemically reacting hydrogen with oxygen, into electrical energy.

In view of the fact that energy density of hydrogen itself is high and that it is unnecessary to provide an active material to a cathode side because oxygen is taken from external air, an energy capacity per volume and weight can be remarkably increased as compared with a conventional battery.

Of fuel cells, a polymer electrolyte fuel cell (PEFC) is an all-solid type using a flexible polymer film as an electrolyte membrane, and thus has characteristics such as excellent handling properties, a simple structure, and rapid start and stop in operation at low temperature. Accordingly, the polymer electrolyte fuel cell is suitably mounted to a portable electronic device.

The polymer electrolyte fuel cell fundamentally includes a polymer electrolyte membrane having proton conductivity, and a pair of electrodes provided on both sides of the polymer electrolyte membrane.

The electrodes include: a catalyst layer formed by mixing a conductive carbon particle carrying platinum black or platinum group metal catalyst, in proton conductive polymer electrolyte; and a gas diffusion electrode formed on an outer surface of the catalyst layer, for supplying a gas and collecting current.

In the polymer electrolyte fuel cell, an assembly in which the electrodes and the polymer electrolyte membrane are integrally formed is referred to as a membrane electrode assembly (hereinafter, referred to as "MEA").

The polymer electrolyte membrane is required to have characteristics such as proton conductivity, a gas barrier property, an electron insulating property, chemical/electrochemical stability, heat resistance, and a high mechanical strength.

To satisfy those requirements, a perfluorosulfonic acid-based ion-exchange resin is suitably and widely used.

In the perfluorosulfonic acid-based polymer electrolyte membrane, it is necessary for water to move along with the conduction of protons. In a case where a water content of the polymer electrolyte membrane is small, the proton conductivity is low, and in a case where the water content is large, the proton conductivity is high. In the case where the proton conductivity of the polymer electrolyte membrane is low, an internal resistance of the fuel cell is significantly increased, whereby fluctuation of the water content of the polymer electrolyte membrane greatly affects power generation. For this reason, it is important to increase the water content of the polymer electrolyte membrane and to devise a method for maintaining the membrane in a humidified state.

Up to now, in order to humidify the polymer electrolyte membrane, the following methods have been employed. That is, there have been employed a method in which a fuel gas is caused to flow in a humidifier (bubbler tank) and to bubble for humidification and then the fuel gas is supplied to a fuel cell, and a method of directly supplying water through a porous plate provided in a fuel cell, a method of supplying a part of a coolant, which is caused to flow in a stack, as humidification water to the MEA, and the like.

However, in the fuel cell for a portable electronic device, it is desirable to omit as many as possible unnecessary auxiliary appliances so as to fabricate the fuel cell with a small size.

In a fuel cell in which a power generation reaction is performed, the proton generated at the fuel electrode moves (electric osmosis) toward an oxidizer electrode side along with water in the polymer electrolyte membrane. At the same time, water is generated at the oxidizer electrode, so that a concentration gradient of the water is generated in the polymer electrolyte membrane.

For this reason, inverse diffusion of the water from the oxidizer electrode toward the fuel electrode is caused, which contributes to the humidification of the electrolyte membrane.

In order to humidify the polymer electrolyte membrane by a power generation reaction and to promptly change the electrical characteristics into a steady state, it is desirable that a current having density as high as possible flow into a fuel cell unit within a range in which the fuel cell unit is not affected.

However, when the current having high density is forced to flow through an external power supply in a state where the water content of the polymer electrolyte membrane is small and the internal resistance is high, a proton supply rate control is caused, which may lead to the deterioration of the fuel cell due to generation of polarity inversion.

Accordingly, it is necessary to perform an activation treatment for stabilizing the electrical characteristics of the fuel cell without causing the polarity inversion.

As a conventional method for performing the activation, Japanese Patent Application Laid-Open Nos. 2000-277136, 2004-047427, and 2005-093282 disclose an activation treatment method of connecting a resistor between a fuel electrode and an oxidizer electrode of a fuel cell prior to supplying power to an electronic device at the time of starting the fuel cell.

In the above-mentioned method, when the resistor is connected between the electrodes, that is, the fuel electrode and the oxidizer electrode, a short-circuit current is caused to flow due to power generation, and produced water generated at the oxidizer electrode at this time is diffused to humidify the polymer electrolyte membrane, thereby activating the fuel cell.

By connecting the resistor between the electrodes, a maximum current corresponding to the activation state of the fuel cell is caused to flow as the short-circuit current. Thereby, the possibility of generating the polarity inversion due to the supply rate control of proton can be reduced compared with an activation method of forcing current to flow.

After the determination of the end of the activation treatment of the fuel cell, generated power is switched from a resistor to the supply for the electronic device, thereby enabling a stable power supply to the electric device.

However, the conventional activation treatment methods for the fuel cell have the following problems.

In the activation treatment methods for the fuel cell or in a starting method using the activation treatment method, the control of the activation treatment is performed while monitoring values of a current, a voltage, an internal resistance, temperature, and the like. Then, a threshold is set for a single parameter or a plurality of parameters, and the set threshold is used as a start point and an end point of the activation.

However, these methods require continuous monitoring for detection of the parameter, which leads to excess power consumption.

Further, in a case where a plurality of units for detecting the parameter are combined, the number of auxiliary appliances is increased, which is inconvenient for reduction in cost and size.

Further, Japanese Patent Application Laid-Open No. 2000-277136 discloses a method of controlling time from the start to the end of activation treatment by using a timer, but does not clearly disclose the time setting. On the one hand, if the set time is short, activation is not sufficiently performed. On the other hand, if the set time is extremely long, there arises a problem of flooding in which a flow path for an oxidizer gas or a fuel gas is blocked by excess produced water.

SUMMARY OF THE INVENTION

In order to solve the above-mentioned problems, the present invention is directed to a fuel cell system capable of determining whether activation treatment for a fuel cell is necessary and setting in advance an end point of the activation treatment, and an activation treatment method for a fuel cell.

In order to solve the above-mentioned problems, the present invention provides a fuel cell system having the following constitution, and an activation treatment method for a fuel cell.

The fuel cell system of the present invention includes: a fuel cell having a fuel electrode and an oxidizer electrode that are provided on both sides of a polymer electrolyte membrane; a resistance detector for detecting an internal resistance of the fuel cell; a load connection portion having a mechanism for connecting a resistor between the fuel electrode and the oxidizer electrode; and a control unit for controlling the load connection portion, wherein the control unit controls an operation of the load connection portion based on a value of the inner resistance of the fuel cell, which is detected by the resistance detector to perform activation treatment of the fuel cell.

Further, the method of the present invention for performing an activation treatment of a fuel cell having a fuel electrode and an oxidizer electrode includes connecting a resistor of a load connection portion between the fuel electrode and the oxidizer electrode to cause a current to flow therethrough, wherein a calibration curve is made in advance based on a correlation between a value of an internal resistance of the fuel cell, and one of a time period and an amount of charge required for displacement of the current flowing through the connected resistor of the load connection portion to reach a saturation point. A control unit stores the calibration curve and controls an operation of the load connection portion based on the value of the internal resistance of the fuel cell, which is detected by a resistance detector, to perform the activation treatment of the fuel cell.

According to the present invention, it is possible to obtain a fuel cell system capable of determining whether the activation treatment for a fuel cell is necessary and setting in advance the end point of the activation treatment based on a parameter such as an internal resistance, and an activation treatment method for a fuel cell.

Further features of the present invention will become apparent from the following description of exemplary embodiments with reference to the attached drawings.

DESCRIPTION OF THE EMBODIMENTS

Figure 1:
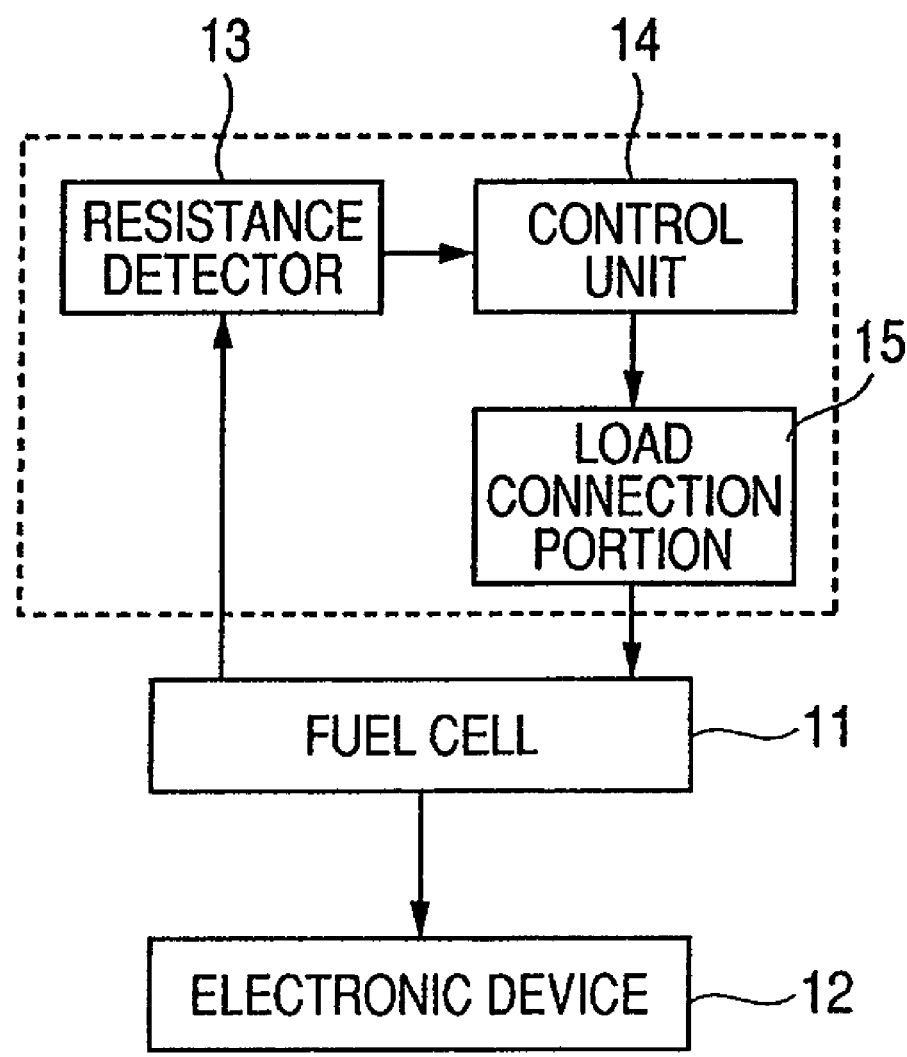
FIG. 1 is a diagram schematically illustrating a fuel cell system according to an embodiment of the present invention.

In an embodiment of the present invention, the load connection portion is controlled based on the internal resistance of the fuel cell, which is detected by a resistance detector, and a load current flows through the fuel cell, thereby enabling employment of a structure for performing an activation treatment including, humidifying a polymer electrolyte membrane.

By a current flowing through the cell at an amount corresponding to the water-containing state, water generated on an oxidizer electrode side is inversely diffused to a fuel electrode side, and the polymer electrolyte membrane is gradually humidified, thereby gradually improving the proton conductivity.

For this reason, by increasing a value of the current that can be used for current successively flowing into the cell, the polymer electrolyte membrane has finally a sufficient water-containing state. When the polymer electrolyte membrane contains a sufficient amount of water, the internal resistance value becomes substantially constant, so that the current flowing through the connected resistor reaches a saturated state. The saturation point in the present specification represents a point at which complete saturation is not attained, but a current value substantially equal to a current for normal driving during the use of the fuel cell can be obtained. Specifically, the saturation point indicates a time point at which a curve of the rise of the current is moderated, and the vicinity thereof arbitrarily determined.

A process for saturation of the current flowing through the connected resistor largely depends on the water content of the polymer electrolyte membrane, that is, the internal resistance of the fuel cell. It is considered that many parts of the internal resistance of the fuel cell are occupied by a resistance, which the proton conductivity of a polymer electrolyte membrane contributes.

A smaller internal resistance indicates that it takes a shorter period of time to saturate the current flowing through the connected resistor, and a larger internal resistance indicates that it takes a longer period of time to saturate the current.

As described above, there is a correlation between the water-containing state (internal resistance) of the electrolyte membrane and one of the time period required for saturation of the current flowing through the connected resistor and the amount of charge required for the current to reach the saturation point. By utilizing the correlation, the activation treatment of the fuel cell can be controlled.

Specifically, in order to control the end point of the activation treatment in advance, a calibration curve is made in advance based on the internal resistance of the fuel cell and one of the time period and the amount of charge required for the current flowing through the resistor connected at the internal resistance to reach the saturation point. By using the calibration curve thus made, the internal resistance of the fuel cell is detected only once, thereby enabling determination of the end point of the activation treatment in advance. The end point of the activation may be determined by using a calibration curve made based on the internal resistance and one of the time period and the amount of charge required for the current flowing through the resistor connected at the internal resistance to reach an arbitrary value set between a current value necessary for the rated operation of the fuel cell and a saturation value.

In addition, the end point of the activation treatment may be determined by using a calibration curve made based on the internal resistance and a value obtained by adding an arbitrary time or an arbitrary amount of charge to the time period or the mount of charge required for the current flowing through the resister connected at the internal resistance to reach the saturation point.

The activation treatment should be performed according to the state of the water content of the polymer electrolyte membrane. When the water content of the polymer electrolyte membrane is high, that is, when the internal resistance is sufficiently low, the activation treatment becomes useless in view of time and power. Accordingly, as in the case of the control of the end point, it is necessary to determine whether the activation treatment is necessary.

Specifically, another calibration curve is made in advance based on a correlation between the internal resistance of the fuel cell and the minimum value of the displacement of the current, which flows when the fuel cell is short-circuited.

Through detection of the internal resistance of the fuel cell, by the use of the another calibration curve thus obtained in advance, it is possible to estimate the minimum value of a current, which flows when the fuel cell is short-circuited before performing the activation treatment.

Determination as to whether the activation treatment is necessary is performed by comparing the minimum value of the current caused to flow when the fuel cell is short-circuited with respect to the internal resistance of the fuel cell with an arbitrary current value necessary for the rated operation of the fuel cell. In other words, the determination is performed when the minimum value of the current, which flows when the fuel cell is short-circuited, is smaller than the current necessary for the rated operation of the fuel cell.

Through the determination of the necessity of the activation treatment and the end point control, the state of the polymer electrolyte membrane of the fuel cell can be promptly changed into the humidified state, and by eliminating the unnecessary activation, the water-containing state of the polymer electrolyte membrane can be efficiently maintained in a desirable state.

Further, it is possible to determine whether the activation treatment is necessary based on one detection of the internal resistance. At the same time, it is possible to determine the end point of the activation treatment.

Next, the embodiment of the present invention will be described in more detail with reference to the drawings.

FIG. 1 is a diagram schematically illustrating a fuel cell system according to the embodiment of the present invention.

The fuel cell system according to this embodiment includes a fuel cell 11, a resistance detector 13 for detecting an internal resistance, a load connection portion 15 for connecting a resistor between both electrodes of the fuel cell, and a control unit 14 for controlling the load connection portion based on the internal resistance detected by the resistance detector.

In the following, an example using a hydrogen gas as a fuel will be described, but the present invention is not limited thereto. In other words, the present invention can be used for a fuel cell using other fuels, such as methanol, as long as the fuel cell includes a polymer electrolyte membrane having proton conductivity and two electrodes, that is, the fuel electrode and the oxidizer electrode that are formed by providing a catalyst layer on both sides of the polymer electrolyte.

In addition, as the polymer electrolyte membrane having proton conductivity, a perfluorosulfonic acid-based proton-exchange resin film is desirably used.

A desirable example of a material of the electrodes includes platinum black or carbon powder carrying platinum fine particles. A catalyst material, such as platinum black or carbon powder carrying platinum particles, is mixed with a polymer electrolyte solution, an organic solvent, such as isopropyl alcohol, and the like, to thereby produce a catalyst ink. Then, this ink is formed into a film on a polymer film made of polytetrafluoroethylene (PTFE) or the like, or on a carbon electrode substrate made of a conductive porous material, by using a spray coating method, a screen printing method, a doctor blade method, or the like, to thereby produce a catalyst layer.

The catalyst layers thus obtained are contacted and bonded on both sides of the polymer electrolyte membrane by thermal transfer or the like, with a catalyst-carrying side of the catalyst layer side facing the surface the polymer electrolyte membrane, thereby providing a membrane electrode assembly for a polymer electrolyte fuel cell.

The polymer electrolyte membrane is required to be rapidly humidified by an inverse diffusion of the produced water generated by the power generation reaction. For this reason, it is desirable that the film be as thin as possible. However, in view of the mechanical strength, the gas barrier property, and the like of the membrane, the thickness thereof is desirably 50 μm to 100 μm.

In this embodiment, the resistance detector 13 is used for measuring the internal resistance of the fuel cell 11.

As a method of detecting the resistance, a method of detecting AC impedance by a frequency response while adjusting a range is preferable, but a method of measuring AC impedance with respect to a specific frequency may also be used. Further, a method of measuring DC resistance may be used.

The load connection portion 15 has a structure for connecting the resistor between both electrodes of the fuel cell. An arbitrary resistance value of the resistor is selected, but it is desirable that the resistor have a lower resistance value, like that of a metal, and a cell voltage be controlled to be approximately 0 V by the connection of the resistor. Further, the resistance value may be made variable corresponding to the change of the internal resistance of the fuel cell.

Further, the control unit 14 is adapted to control the operation of the load connection portion 15 based on the internal resistance detected by the resistance detector 13.

Next, the control unit 14 will be described in more detail.

Figure 2:
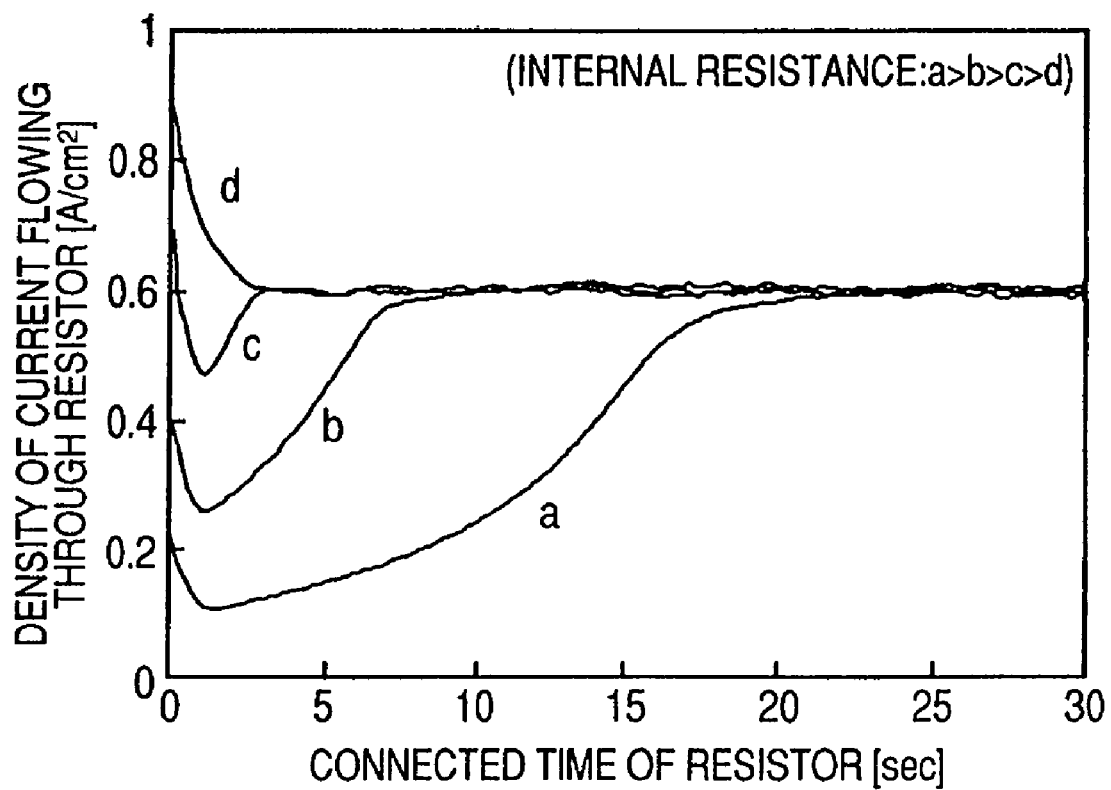
FIG. 2 is a graph for illustrating displacement of a load current, which flows when a resistor is connected between both electrodes of the fuel cell, with respect to time, according to an embodiment of the present invention.
Figure 3:
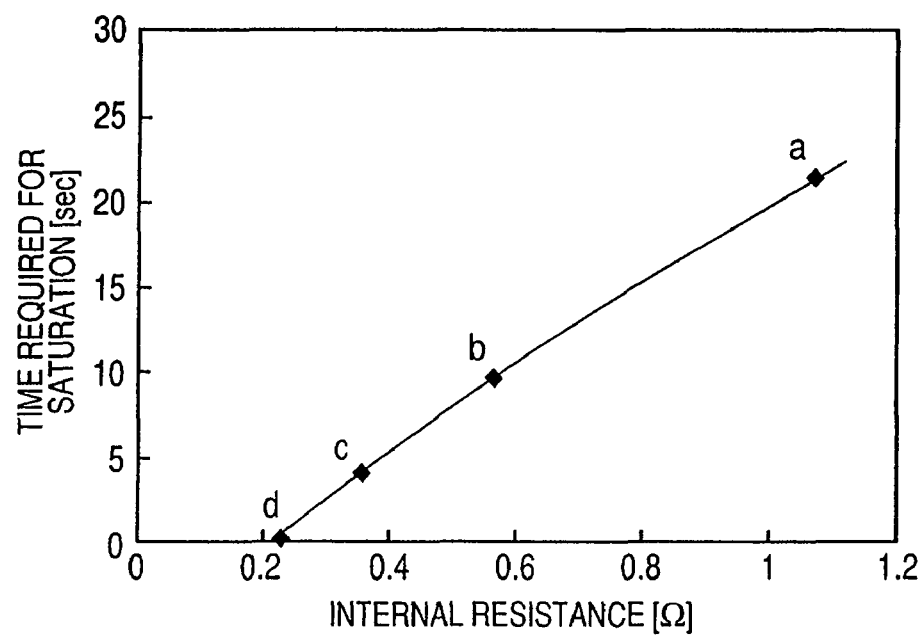
FIG. 3 is a graph for illustrating a relationship between an internal resistance value and a time period required for saturation of the load current in the fuel cell according to an embodiment of the present invention.
Figure 4:
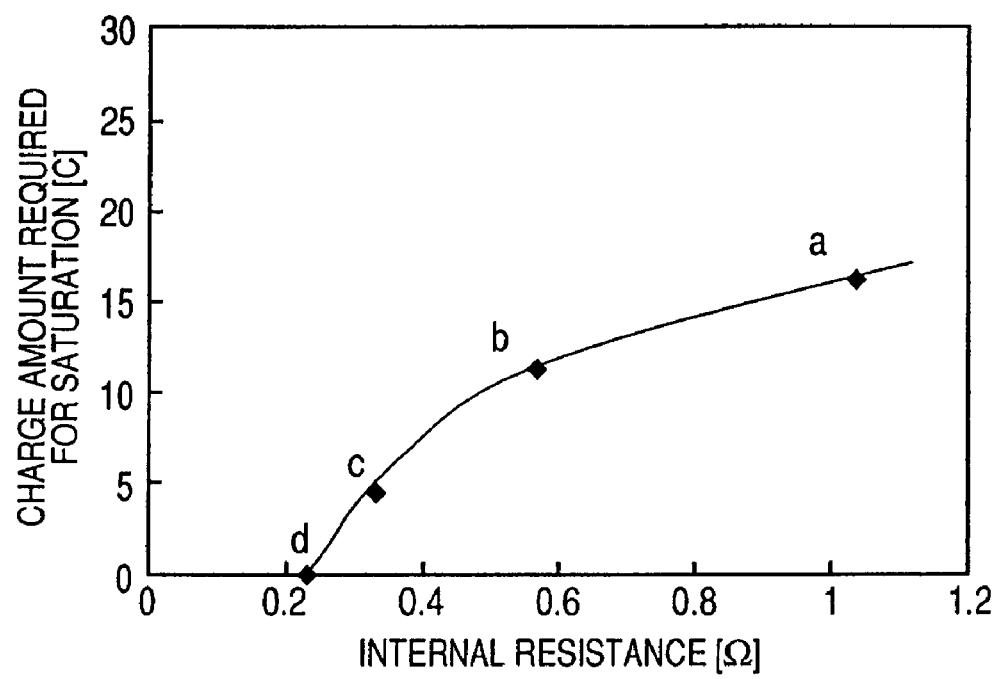
FIG. 4 is a graph for illustrating a relationship between an internal resistance value and an amount of charge required for saturation of the load current in the fuel cell according to an embodiment of the present invention.

FIG. 2 illustrates displacement with respect to a time period for a current to flow through the resistor when the resistor is connected between both electrodes of the fuel cell. FIG. 3 illustrates a relationship between an internal resistance value and a saturation time for a current flowing through the connected resistor. FIG. 4 illustrates a relationship between an internal resistance value and an amount of charge required for saturation of the current flowing through the connected resistor.

In a case where the resistor is connected to the fuel cell unit, the fuel cell unit allows a current to flow therethrough only at an amount corresponding to the water-containing state (that is, proton conductivity) of the polymer electrolyte membrane, thereby causing no polarity inversion.

Because the current flows at the amount corresponding to the water-containing state, the water produced on the oxidizer electrode side is inversely diffused toward the fuel electrode side, thereby gradually humidifying the polymer electrolyte membrane and gradually improving the proton conductivity.

As a result, the value of the current that can be used for the current flow is continuously increased, and the polymer electrolyte membrane finally has a sufficient water-containing state. When the polymer electrolyte membrane contains a sufficient amount of water, the internal resistance value becomes substantially constant, whereby the load current reaches a saturated state.

As described above, the process of the saturation of the current largely depends on the water content of the polymer electrolyte membrane, that is, on the internal resistance of the fuel cell. A smaller internal resistance indicates that it takes a shorter period of time to saturate the current. A larger internal resistance indicates that it takes a longer period of time to reach the saturation point. Based on the fact, it is apparent that there is a correlation between the water-containing state (internal resistance) of the polymer electrolyte membrane and the time period required for the saturation of the current, or the amount of charge required to reach the saturation point. By utilizing the correlation, it is possible to control the activation treatment of the fuel cell.

Specifically, the control unit 14 stores information on a table for control or a calibration curve made based on the internal resistance value of the fuel cell and the time period or the amount of charge required for the current flowing through the connected resistor to reach the saturation point.

The control unit 14 is adapted to obtain the time period or the amount of charge required for operating the load connection portion 15 with respect to the internal resistance value obtained by the resistance detector 13 based on information on the table for control or the calibration curve, to thereby control the load connection portion 15.

Specifically, control of the load connection portion is performed as follows.

(1) Using the Table for Control

The values of the time period or the amount of charge required for the necessary activation treatment with respect to the values of the internal resistance of the fuel cell are stored in a table for control in advance. In this case, the width of the values of the internal resistance is suitably adjusted, and, for example, it is widely or finely adjusted depending on a storage capacity of a used storage device and a required control accuracy. The time period or the amount of charge required for the activation treatment is determined from the thus made table and the measured value of the internal resistance, and the control unit 14 controls the load connection portion 15 so that the connected time of the resistor or the amount of charge becomes a determined value.

(2) Using the Calibration Curve

A plurality of pairs of the value of the internal resistance of the fuel cell and the value of the time period or the amount of charge required for the activation treatment corresponding to the value of the internal resistance are obtained. Then, an equation of a relationship between these values is determined by the minimum square method to make a calibration curve. The time period or the amount of charge required for the activation treatment is determined from the thus made calibration curve and the measured value of the internal resistance, and the control unit 14 controls the load connection portion 15 so that the connected time of the resistor or the amount of charge becomes a determined value.

Further, the calibration curve stored in advance in the control unit 14 may be made based on the relationship between the internal resistance value and the time period or the amount of charge required for the displacement of the current flowing through the resistor when the resistor is connected between the both electrodes to reach an arbitrary value, which is equal to or larger than the current required for the rated operation of the fuel cell and is equal to or smaller than the saturation value.

Further, the calibration curve stored in advance in the control unit 14 may be made based on the relationship between the internal resistance value and a value obtained by adding an arbitrary time or an arbitrary amount of charge to the time period or the amount of charge required for the displacement of the current flowing through the resistor when the resistor is connected between the both electrodes to reach the saturation point.

Next, the end point control in the activation method for the fuel cell system according to this embodiment in the case of using the calibration curve will be more specifically described.

Figure 5:
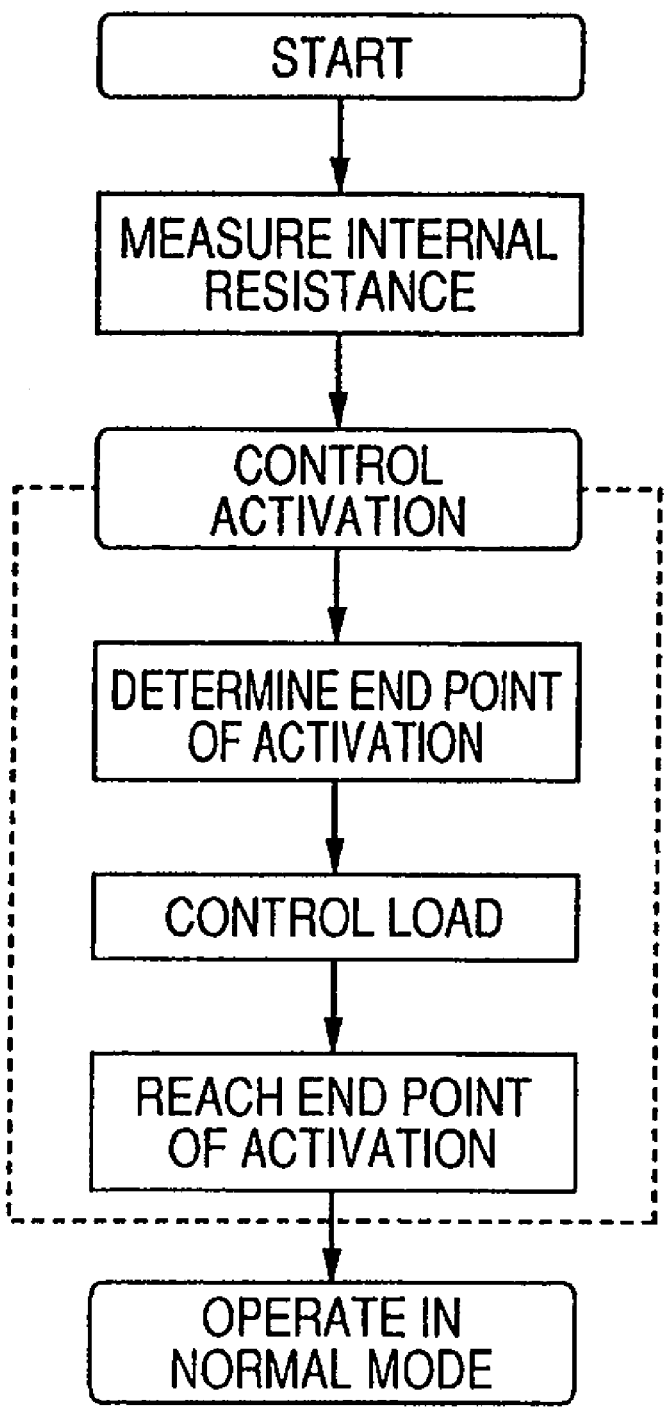
FIG. 5 is a flowchart for illustrating a control of an end point in an activation treatment method employing the fuel cell system according to an embodiment of the present invention.

FIG. 5 is a flowchart for illustrating the end point control in the activation treatment method for the fuel cell system according to the embodiment of the present invention.

In this embodiment, the internal resistance of the fuel cell 11 is first detected by the resistance detector 13, and the control unit 14 estimates the time period or the amount of charge required for operating the load connection portion 15, form the information on the calibration curve made in advance based on the internal resistance value.

Specifically, the internal resistance is first detected only once, thereby automatically determining the end point of the activation.

The end point control is performed with the time period or the amount of charge being used as a parameter, thereby promptly performing switching to supply power to the electronic device 12 after the activation treatment reaches the end point.

In addition, it is unnecessary to continuously monitor the voltage, the current, or the like for the end point control, unlike in a conventional case, thereby enabling removal of a useless mechanism.

By performing the above-mentioned activation treatment, it is possible to promptly change the electrical characteristic of the fuel cell into a steady state.

By performing the activation treatment prior to starting of the fuel cell, it is possible to stabilize the electrical characteristic of the fuel cell from the start of the fuel cell and to stably supply power to the electronic device.

The activation treatment should be optionally performed according to the state of the water content of the polymer electrolyte membrane. When the water content is large, that is, when the internal resistance is sufficiently low, the activation treatment becomes useless in terms of time and power. Accordingly, determination of the necessity of the activation is important.

Figure 6:
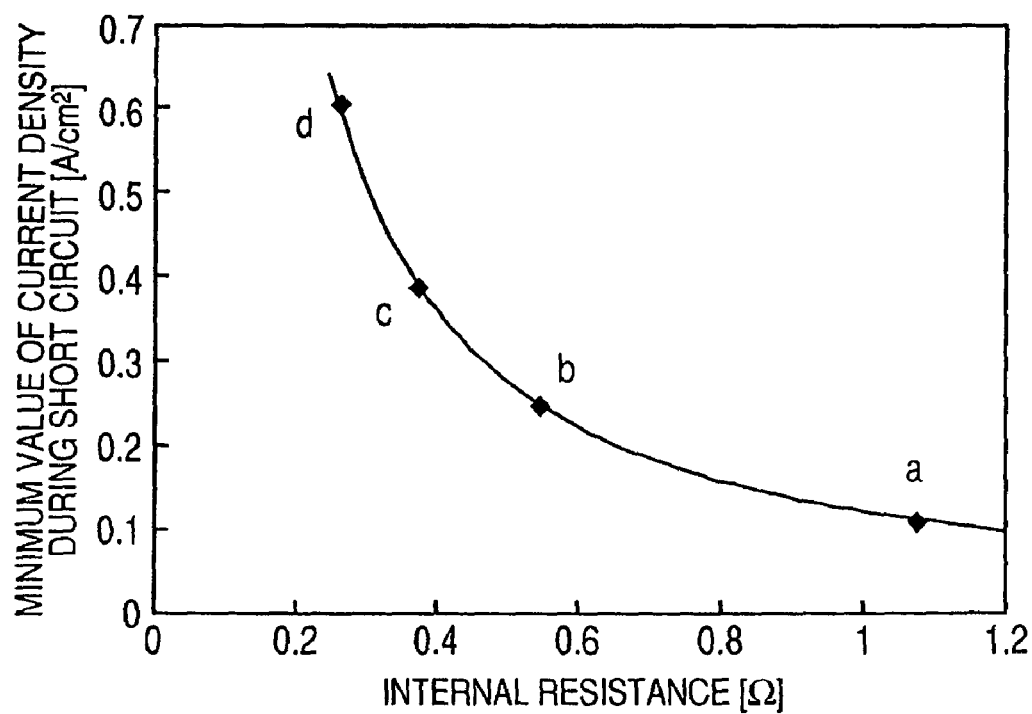
FIG. 6 is a graph for illustrating a relationship between an internal resistance value and a minimum value of displacement of a current, which flows when the fuel cell is short-circuited, in the fuel cell according to an embodiment of the present invention.

FIG. 6 illustrates a relationship between the internal resistance value of the fuel cell and the minimum value of the displacement of the current, which flows when the fuel cell is short-circuited.

It is assumed that the minimum value of the displacement of the current which flows when the fuel cell is short-circuited corresponds to a limiting current value determined based on the proton conductivity corresponding to the water content of the polymer electrolyte membrane of the fuel cell before performing the activation treatment.

In a case where the limiting current value is larger than the current arbitrarily determined for the rated operation of the fuel cell, there is little possibility of generating the polarity inversion in driving the fuel cell, so that it is not always necessary to perform the activation treatment. Specifically, in order to determine whether the activation treatment is necessary, another calibration curve is made in advance based on the internal resistance of the fuel cell and the minimum value of the current, which flows when the fuel cell is short-circuited.

Through detection of the internal resistance of the fuel cell, it is possible to estimate the limiting current value of the fuel cell before performing the activation by using another calibration curve made in advance.

Determination of the necessity of the activation treatment is performed based on the limiting current value with respect to the internal resistance of the fuel cell and the arbitrary current value necessary for the necessary rated operation, and the determination is performed when the limiting current value is smaller than the current value necessary for the rated operation.

Figure 7:
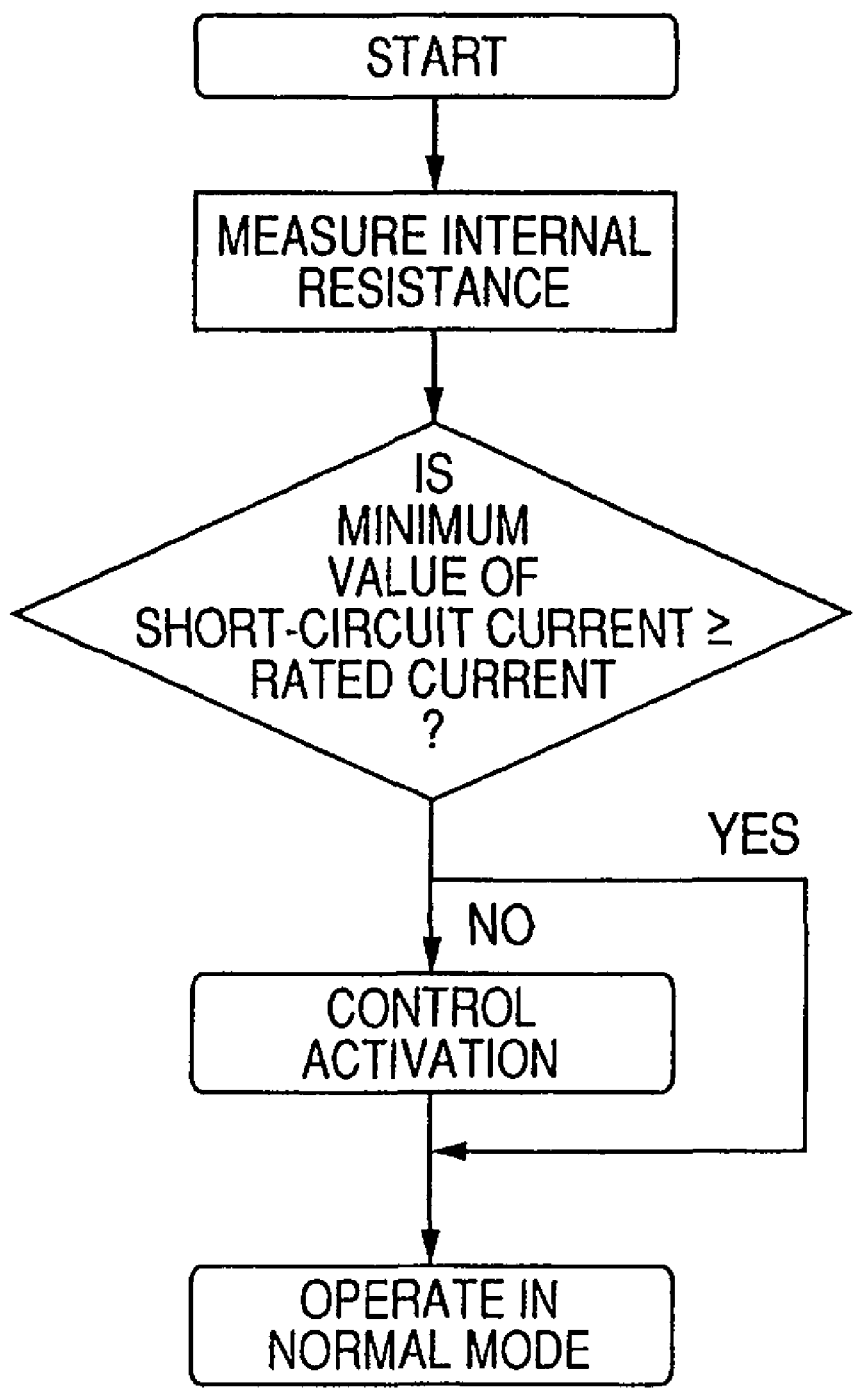
FIG. 7 is a flowchart for illustrating a control for a start point of the activation treatment method employing the fuel cell system according to an embodiment of the present invention.

In other words, as illustrated in the flowchart of FIG. 7, the internal resistance of the fuel cell is detected by the resistance detector, thereby estimating the limiting current value of the fuel cell before performing the activation treatment based on the another calibration curve. In the case where the limiting current value is smaller than the current value necessary for the rated operation, the activation treatment is performed.

By controlling the start point and the end point of the activation in the activation treatment method for the fuel cell system according to this embodiment, the polymer electrolyte membrane of the fuel cell can be promptly changed into a humidified state.

In addition, by omitting the useless activation treatment, it is possible to maintain the water-containing state of the polymer electrolyte membrane in driving the fuel cell after the activation treatment to a desirable state and perform a smooth operation of the system.

For the activation treatment of the fuel cell, the necessity of the activation can be determined based on one detection of the internal resistance, and the end point of the activation can be determined.

As a result, at the time of starting/driving the fuel cell after the activation treatment, stable electrical characteristics necessary for the rated operation can be obtained.

In a case where the activation treatment method of the present invention is applied to the fuel cell stack including a plurality of fuel cell units, it is desirable to detect the internal resistance and perform the activation treatment for each fuel cell unit of the stack.

In addition, it is desirable to detect the internal resistance of the entire stack to calculate an average value of the internal resistances of each fuel cell unit and perform the activation treatment for each fuel cell unit based on the average value.

In a case where the method of starting the fuel cell according to the present invention is applied to the fuel cell stack including a plurality of cell units, it is desirable to detect the internal resistance, determine whether the activation treatment is necessary, and perform the activation treatment, respectively, for each fuel cell unit of the stack.

Further, it is desirable to detect the internal resistance of the entire stack to calculate an average value of the internal resistances of each fuel cell unit and to perform the activation treatment for each unit.

According to the fuel cell system, the activation treatment method, and the starting method of this embodiment, it is possible to promptly change the electrolyte membrane into the humidified state, and to provide a fuel cell having stable electrical characteristics, which can be obtained from the start of the fuel cell.

Hereinafter, embodiments of the present invention will be described.

Embodiment 1

Figure 8:
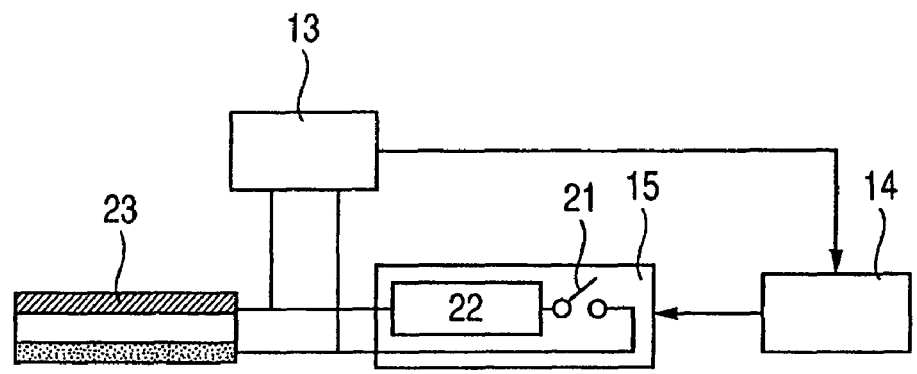
FIG. 8 is a diagram schematically illustrating a fuel cell system according to Embodiment 1 of the present invention.

FIG. 8 is a schematic diagram illustrating a fuel cell system according to Embodiment 1 of the present invention.

In Embodiment 1, the following fuel cell is produced.

First, a catalyst slurry is produced by mixing platinum black powder with 5% Nafion alcohol-based solution, and then the catalyst slurry is developed and coated on a PTFE sheet to obtain a catalyst electrode layer.

Next, the catalyst electrode layer is thermally transferred onto both sides of a polymer electrolyte membrane (Nafion 112 (manufactured by Du Pont)) having a film thickness of 2 mm to produce a membrane electrode assembly (MEA). The MEA thus produced had a catalyst area of about 2 $cm^2$.

On both sides of the MEA thus produced, diffusion layers for diffusing and supplying a hydrogen gas serving as fuel and the air serving as an oxidizer were provided so as to sandwich the diffusion layer with a separator, thereby producing the fuel cell.

Hydrogen is supplied to one electrode as a fuel electrode, and the air is supplied to the other electrode as an oxidizer electrode.

A change of an internal resistance of the fuel cell was observed in a case where a fuel cell unit 23 was placed in a constant temperature-humidity bath and the humidity was changed by 10% in a range of 30% to 60% at a temperature of 30° C. The internal resistance of the fuel cell largely depends on the water content of the polymer electrolyte membrane. Accordingly, as the humidity becomes lower, the resistance becomes larger, and as the humidity becomes higher, the resistance becomes smaller.

In addition, displacement of a current flowing through a resistor 22 when the resistor 22 is connected between both electrodes of the fuel cell 23 was measured with respect to the internal resistance. The internal resistance was obtained by measuring the AC impedance by the frequency response.

The resistor 22 has a lower resistance value, like that of a metal, and is sufficiently smaller than the internal resistance of the fuel cell. By the connection of the resistor 22, the voltage of the fuel cell is approximately 0 V.

The fuel cell unit 23 was placed in the bath for several hours so that the fuel cell unit 23 reaches an equilibrium state with respect to the temperature and the humidity, and then the internal resistance was measured.

FIG. 2 illustrates a measurement result of the displacement of the value of the current flowing through the connected resistor for each of fuel cells (a, b, c, and d) having different internal resistance values. As illustrated in FIG. 2, after the resistor was connected, the current values of the fuel cells, except for the fuel cell (d) having the smallest internal resistance, were reduced once to the minimum value and were then increased. When the polymer electrolyte membrane had a sufficient water content, the current was saturated. The larger is the internal resistance, the smaller is the current flowing through the resistor, and the time period required for saturation increases. FIG. 3 is obtained by plotting the relationship between the internal resistance and the time period required for the current flowing through the connected resistor to reach the saturation point. The larger is the internal resistance, the longer is the time period required for saturation. In a case where the resistor having a small resistance value as in this embodiment is connected, at an environmental temperature of 30° C., it is found that the activation treatment is finished in about 20 seconds at the longest. The relationship between the internal resistance and the time period required for saturation is represented by an approximation (A) to thereby make a curve. FIG. 4 is obtained by plotting the relationship between the internal resistance and the amount of charge required for the current flowing through the connected resistor to reach the saturation point. As illustrated in FIG. 4, the relationship between the internal resistance and the amount of charge required for saturation is also represented by an approximation (A') to thereby make a curve.

After the fuel cell unit 23 was left in the environment in which the temperature and the humidity are arbitrarily set, the activation treatment was performed by applying the fuel cell system according to the present invention.

The resistance detector 13 measures the internal resistance of the fuel cell unit 23 based on the AC impedance by the frequency response and transmits data of the resistance value to the control unit 14.

The control unit 14 calculates a time period or an amount of charge when the resistor 22 is connected based on the data of the approximation (A) or (A') up to the time when the current reaches the saturation point from the internal resistance value detected by the resistance detector 13. The control unit 14 controls an operation of the load connection portion 15 based on the time period or the amount of charge thus calculated. Specifically, the activation treatment is finished at the time when the time period or the amount of charge reaches the calculated time period or amount of charge. In addition, the control unit 14 has a mechanism for performing switching between current flowing for the activation treatment of the fuel cell and current flowing for supplying power to the electronic device.

The load connection portion 15 includes the resistor 22, which has a sufficiently small resistance value, like that of a metal, and is connected between both electrodes of the fuel cell unit 23. In addition, the load connection portion 15 has a switch 21 for switching on/off of the electrical connection provided at one end thereof. The switch 21 is a normally-open switch, but it is in a closed state when the activation is performed. The switch 21 is controlled by the control unit 14.

After the activation treatment was performed, a current having a density of 300 mA/cm$^2$, which was the power rating of the fuel cell, was applied to the fuel cell. By performing the activation treatment, the fuel cell could obtain good and stable characteristics from the initial state.

In a case where the activation treatment was not performed, the initial power generation characteristic is low, and it took 30 seconds or longer to obtain the steady state.

Embodiment 2

A fuel cell produced in the same manner as in Embodiment 1 was placed in a constant temperature-humidity bath, the humidity was adjusted by 10% in a range of 30% to 60% at a temperature of 30° C., and a change of an internal resistance of the fuel cell and displacement of a value of a current flowing through the connected resistor were observed.

The displacement of the current flowing through the connected resistor was measured with respect to the internal resistance. As illustrated in FIG. 2, after the resistor was connected, the current values of the fuel cells, except for the fuel cell (d) having a smallest internal resistance, were reduced once to the minimum value and were then increased. When the polymer electrolyte membrane had a sufficient water content, the current was saturated.

FIG. 3 was obtained by plotting the relationship between the internal resistance value and the time period required for the current flowing through the connected resistor to reach the saturation point. The relationship was represented by an approximation (A) to thereby make a curve.

Further, FIG. 6 was obtained by plotting the relationship between the internal resistance value and the minimum value of the displacement of the current flowing through the connected resistor. The relationship was represented by an approximation (B) to thereby make a curve. In this case, the current flowing through the resistor indicates a current, which flows when the fuel cell is maintained at about 0 V. For this reason, the current flowing through the resistor is assumed to be equal to the limiting current of the fuel cell. As illustrated in FIG. 6, it is apparent that the larger is the internal resistance, the smaller is the minimum value of the current, which flows when the fuel cell is short-circuited. In a case where a current having a density of 300 mA/cm$^2$, which was the power rating of the fuel cell, was applied to the fuel cell without performing the activation treatment, in a state of internal resistors a and b in which the minimum current value is smaller than 300 mA/cm$^2$, the power generation performance becomes insufficient, which may cause a polarity inversion. In this case, it is necessary to perform the activation treatment. In a state of internal resistors c and d in which the minimum current value is larger than 300 mA/cm$^2$, there is little possibility of generating the polarity inversion, so that it is not necessity to perform the activation treatment.

After the fuel cell unit 23 was left in the environment in which the temperature and the humidity were arbitrarily set, the method of starting the fuel cell was carried out by applying the fuel cell system according to the present invention.

The resistance detector 13 measures the internal resistance of the fuel cell unit 23 based on the AC impedance by the frequency response and transmits data of the resistance value to the control unit 14.

The control unit 14 first determines whether the activation treatment is necessary from the internal resistance value detected by the resistance detector 13 based on the approximation (B).

Specifically, it is assumed that the minimum value of the displacement of the current flowing through the connected resistor corresponds to the limiting current value of the fuel cell before performing the activation treatment. In a case where the limiting current value is smaller than the current value arbitrarily determined for the rated operation, the fuel cell cannot tolerate the load fluctuation caused on the electrode device side, which may cause a polarity inversion. In this case, it is necessary to perform the activation treatment. In a case where the limiting current value is larger than the current value arbitrarily determined for the rated operation, there is little possibility of generating the polarity inversion in driving the fuel cell, so that there is no need to perform the activation treatment.

In a case where it is determined that the activation treatment is unnecessary, the fuel cell unit 23 is directly switched to perform the operation for supplying power to the electronic device by the control unit 14.

In a case where it is determined that the activation treatment is necessary, the control unit 14 calculates the time period for performing the activation treatment from the internal resistance value previously measured based on the approximation (A).

The control unit 14 controls the operation of the load connection portion 15 based on the calculated time period.

After the activation treatment was performed, the current having a density of 300 mA/cm$^2$, which was the power rating of the fuel cell, was applied to the fuel cell.

In a case where it was determined that the activation treatment was necessary and then the activation treatment was performed, good and stable characteristics were obtained from the initial state.

In the case where it is determined that the activation treatment was unnecessary, the initial characteristics were a little lower than those of the case in which the activation treatment was performed, and the time period for obtaining the steady state was a little longer in some cases, but the characteristics sufficient for stably performing the rated operation were obtained.

In a case where the activation treatment was not performed while it was determined that the activation treatment was necessary, the initial power generation characteristic was low and the time period for obtaining the steady state was long, that is, 30 seconds or longer. The polarity inversion due to the proton supply rate control was also observed.

As a result, it is possible to determine the necessity of the activation treatment based on one detection of the internal resistance. At the same time, it is possible to calculate the time period required for the activation, thereby enabling smooth starting of the fuel cell while preventing the loss of time and power.

Instead of representing the parameter of the time in the calibration curve by the time period required for the load current to reach the saturation current, when the parameter of the time is represented by the time period required for the load current to reach an arbitrary current value necessary for the rated operation, or by a value obtained by adding arbitrary time after saturation, the same result was obtained.

Embodiment 3

Figure 9:
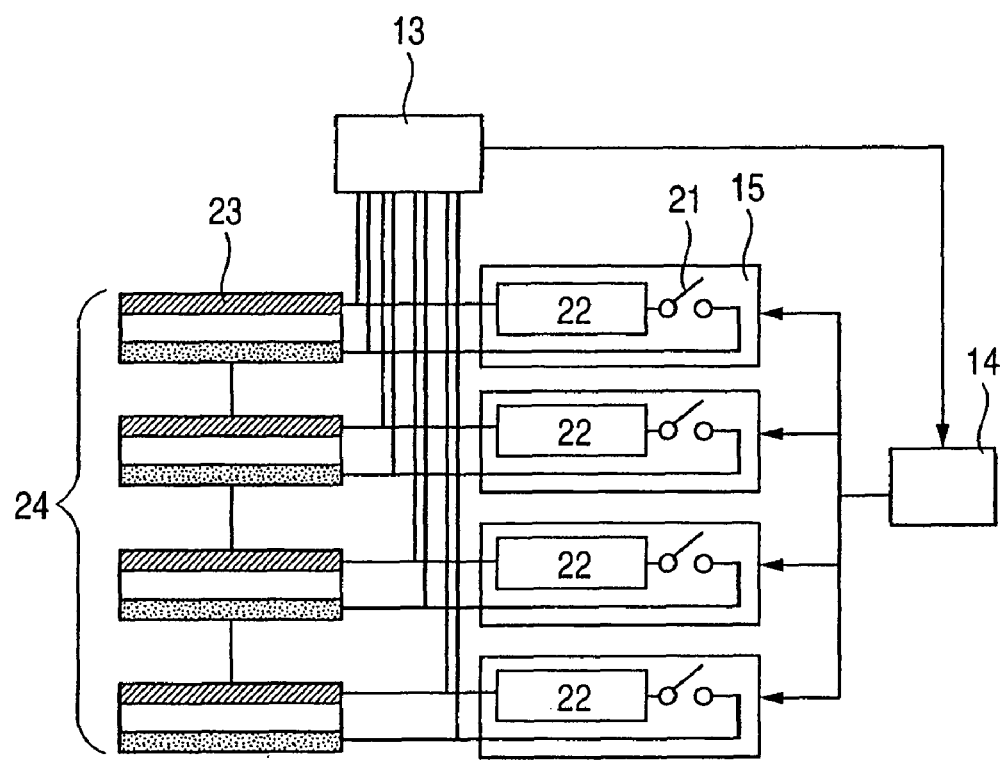
FIG. 9 is a diagram schematically illustrating a fuel cell system according to Embodiment 3 of the present invention.

FIG. 9 is a schematic diagram illustrating a fuel cell system according to Embodiment 3 of the present invention.

A fuel cell stack 24 has a structure in which a plurality of fuel cell units 23 according to Embodiment 1 are stacked. In addition, the fuel cell units of the fuel cell stack 24 are each provided with the resistor detector 13, the load connection portion 15, and the control unit 14. The resistance detector 13 detects the internal resistance of each fuel cell unit of the fuel cell stack 24. The control unit 14 controls the load connection portion 15 for each fuel cell unit based on the internal resistance of each fuel cell unit.

Calibration curves may be made for respective fuel cell units of the fuel cell stack 24, or a calibration curve made for a single fuel cell unit may be applied to the other fuel cell units of the stack.

After the fuel cell stack 24 is left in the environment in which the temperature and the humidity were arbitrarily set, the activation treatment is performed by applying the fuel cell system according to the present invention.

The resistance detector 13 measures the internal resistance of each fuel cell unit of the fuel cell based on the AC impedance by the frequency response and transmits data of the resistance value of each fuel cell unit to the control unit 14.

The control unit 14 calculates the time period or the amount of charge when the resistor 22 is connected to each fuel cell unit based on the approximation representing the relationship between the internal resistance value of each fuel cell unit detected by the resistance detector 13 and the time period or the amount of charge required for the load current to reach the saturation point. The control unit 14 controls the operation of the load connection portion 15 of each fuel cell unit based on the time period or the amount of charge thus calculated. In this case, the control unit 14 may be adapted to control the activation treatment of the entire fuel cell unit in accordance with the fuel cell unit having a highest internal resistance from data of the resistance values transmitted from the resistance detector 13.

The load connection portion 15 includes the resistor 22, which has a sufficiently small resistance value, like that of a metal, and is connected between both electrodes of the fuel cell unit 23. In addition, the switch 21 for switching the electrical connection on/off is provided at one end of the load connection portion 15. The switch 21 is a normally-open switch, but it is in a closed state when the activation treatment is performed. The switch 21 is controlled by the control unit 14.

After the activation treatment is performed, a current having a density of 300 mA/cm$^2$, which is the power rating of the fuel cell, is applied to the fuel cell. By performing the activation treatment, the fuel cell stack can obtain highly stable characteristics from the initial state. At the same time, variation in characteristics of fuel cell units is suppressed.

Embodiment 4

Figure 10:
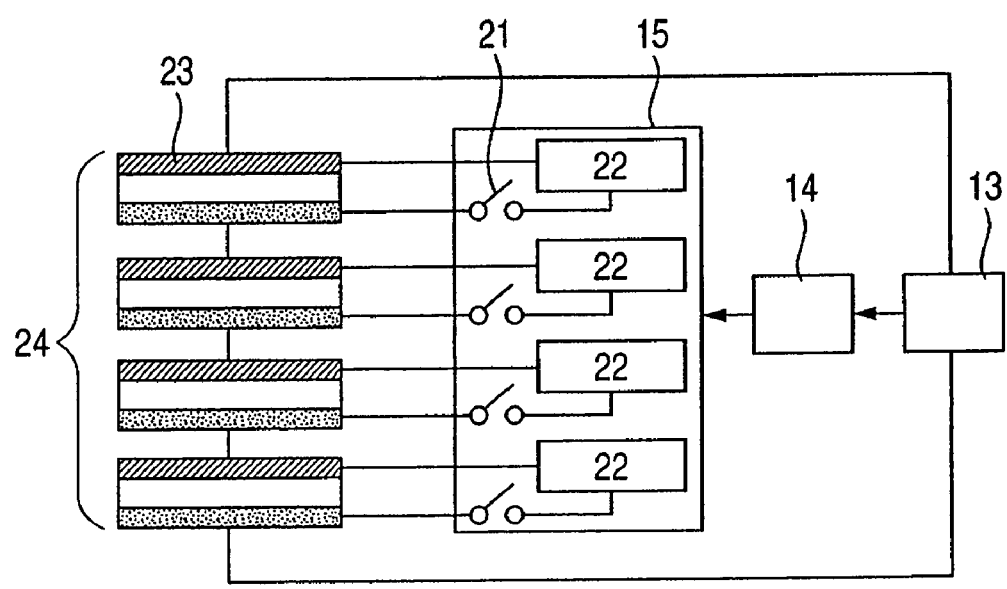
FIG. 10 is a diagram schematically illustrating a fuel cell system according to Embodiment 4 of the present invention.

FIG. 10 is a schematic diagram illustrating a fuel cell system according to Embodiment 4 of the present invention.

The fuel cell stack 24 has a structure in which a plurality of fuel cell units 23 according to Embodiment 1 are stacked. The fuel cell units of the fuel cell stack 24 are each provided with the load connection portion 15. The resistance detector 13 is adapted to measure the internal resistance of the entire fuel cell stack between output terminals of the fuel cell stack 24. The control unit 14 calculates an average value of the internal resistance of a single fuel cell unit from the internal resistances of the entire fuel cell stack and collectively controls the load connection portions 15 for each fuel cell unit based on the average value of the internal resistances.

A calibration curve may be made based on the average value for each fuel cell unit of the fuel cell stack 24, or another calibration curve made for a single fuel cell unit may be applied as an average value of each fuel cell unit of the stack.

After the fuel cell stack 24 is left in the environment in which the temperature and the humidity are arbitrarily set, the activation treatment is performed by applying the fuel cell system according to the present invention.

The resistance detector 13 measures the internal resistance between the output terminals of the fuel cell stack 24, that is, the internal resistance of the entire fuel cell stack based on the AC impedance by the frequency response, and transmits data of the resistance value of each fuel cell unit to the control unit 14.

The control unit 14 calculates the average value of the internal resistance of a single fuel cell unit from the internal resistance values of the entire fuel cell stack cell detected by the resistance detector 13. The control unit 14 calculates the time period or the amount of charge when the resistor 22 is connected to each fuel cell based on the approximation representing the relationship between the internal resistance value and the time period or the amount of charge required for the load current to reach the saturation point. The control unit 14 controls the operation of the load connection portion 15 of each fuel cell unit based on the time period or the amount of charge thus calculated.

The load connection portion 15 includes the resistors 22 each of which has a sufficiently small resistance value like a metal and is connected between the both electrodes of the fuel cell unit 23. In addition, each of the load connection portions 15 has the switch 21 for switching on/off the electrical connection provided at one end thereof. The switch 21 is a normally-open switch and is in a closed state when the activation treatment is performed. The switches 21 are collectively controlled by the control unit 14.

After the activation treatment is performed, a current having a density of 300 mA/cm$^2$, which is the power rating of the fuel cell stack, is applied to the fuel cell stack. By performing the activation treatment, the fuel cell stack exhibited highly stable characteristics from the initial state, and the variation in characteristics of the fuel cell units is suppressed. By simplifying the detection of the internal resistance and the control of the load connection portion, the detector was downsized and the number of components, such as a lead wire, is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-190489, filed Jul. 11, 2006, and Japanese Patent Application No. 2007-129083, filed May 15, 2007, which are hereby incorporated by reference herein in their entirety.

What is claimed is:

1. A fuel cell system, comprising:
   a fuel cell having at least one fuel cell unit comprised of a fuel electrode, an oxidizer electrode, and a polymer electrolyte membrane, wherein the fuel electrode and the oxidizer electrode are disposed on opposite sides of the polymer electrolyte membrane;
   a resistance detector detecting an internal resistance of the fuel cell;
   a load connection portion having a mechanism operatively, electrically connecting a resistor to the fuel electrode and the oxidizer electrode; and
   a control unit configured to control the load connection portion,
   wherein the control unit controls an operation of the load connection portion based on a value of the internal resistance of the fuel cell, which is detected by the resistance detector, to perform an activation treatment of the fuel cell, wherein
   the control unit has, stored thereon, a calibration curve made based on a correlation between the value of the internal resistance of the fuel cell, and a time period or an amount of charge required for a change in a current flowing through the electrically connected resistor of the load connection portion to reach a saturation point, and wherein
   the control unit calculates, from the calibration curve, another time period or another amount of charge required for operating the load connection portion, based on the value of the internal resistance of the fuel cell, which is detected by the resistance detector, and wherein
   the control unit configured to control the operation of the load connection portion based on the calculation from the calibration curve to perform the activation treatment of the fuel cell.

2. A fuel cell system, comprising:
   a fuel cell having at least one fuel cell unit comprised of a fuel electrode, an oxidizer electrode, and a polymer electrolyte membrane, wherein the fuel electrode and the oxidizer electrode are disposed on opposite sides of the polymer electrolyte membrane;
   a resistance detector detecting an internal resistance of the fuel cell;
   a load connection portion having a mechanism operatively, electrically connecting a resistor to the fuel electrode and the oxidizer electrode; and
   a control unit configured to control the load connection portion,
   wherein the control unit controls an operation of the load connection portion based on a value of the internal resistance of the fuel cell, which is detected by the resistance detector, to perform an activation treatment of the fuel cell,
   wherein the control unit has, stored thereon, a calibration curve made based on a correlation between the value of the internal resistance of the fuel cell, and a minimum value of change in a current, which flows when the fuel cell is short-circuited,
   wherein the control unit calculates, from the calibration curve, a minimum value of the current, which flows when the fuel cell is short-circuited before the activation treatment, based on the value of the internal resistance of the fuel cell, which is detected by the resistance detector, and
   wherein the control unit configured to control the operation of the load connection portion when the minimum value of the current when the fuel cell is short-circuited is smaller than a predetermined current value, to perform the activation treatment of the fuel cell.

3. The fuel cell system according to claim 2, wherein the predetermined current value is a current value necessary for a rated operation.

4. The fuel cell system according to claim 2, wherein:
   the fuel cell comprises a fuel cell stack including a plurality of fuel cell units, the plurality of fuel cell units each being provided with the load connection portion; and
   the control unit controls the operation of the load connection portion for each of the fuel cell units, based on values of internal resistances of the fuel cell units, which are detected by the resistance detector, to perform the activation treatment of the fuel cell.

5. The fuel cell system according to claim 1, wherein:
   the fuel cell comprises a fuel cell stack including a plurality of fuel cell units, the plurality of fuel cell units each being provided with the load connection portion; and
   the control unit controls the operation of the load connection portion for each of the fuel cell units, based on values of internal resistances of the fuel cell units, which are detected by the resistance detector, to perform the activation treatment of the fuel cell.

* * * * *